United States Patent [19]

Tsuchiya

[11] 4,304,159

[45] Dec. 8, 1981

[54] AUTOMATIC SCREW MACHINES

[75] Inventor: Yoshifumi Tsuchiya, Ohme, Japan

[73] Assignee: Takayuki Nomura, Tokyo, Japan

[21] Appl. No.: 136,739

[22] Filed: Apr. 2, 1980

[30] Foreign Application Priority Data

May 22, 1979 [JP] Japan .................................. 54/62973

[51] Int. Cl.³ ............................................ B23B 15/00
[52] U.S. Cl. ...................................... 82/2.5; 29/37 A
[58] Field of Search ................... 82/2.5, 2.7; 29/37 A, 29/27 C

[56] References Cited

U.S. PATENT DOCUMENTS 3,835,515 9/1974 Kersten et al. ..................... 29/37 A
4,087,890 5/1978 Ishizuka et al. ..................... 29/37 A

*Primary Examiner*—Leonidas Vlachos
*Attorney, Agent, or Firm*—Fidelman, Wolffe & Waldron

[57] ABSTRACT

A machine tool for working elongated rod-like materials in rotation, particularly an automatic screw machine capable of working thin and long materials with a high degree of accuracy comparable to that of a headstock moving type automatic screw machine without involving any error in the indexing of the cutting tools for the work. The tool stand is reduced in weight, and movable along the longitudinal axis of the work, so that the machine is easy and inexpensive to manufacture.

3 Claims, 5 Drawing Figures

AUTOMATIC SCREW MACHINES

The present invention relates to a machine tool for working elongated rod-liked materials in rotation, and more particularly, to an automatic screw machine which provides a high degree of accuracy in working long and small-diameter products.

There are known a number of types of automatic screw machines, which have been used in different ways depending on the shape of the work, etc., and have manifested their own advantages effectively. Above all, a headstock moving type automatic screw machine has been found suitable for working relatively thin and long materials, as it has a guide bush by which the work is supported when it is cut.

In a headstock moving type automatic screw machine, cutting tools are radially disposed on a tool stand on which the guide bush is supported, and are radially movable to and away from the work. The tools are, however, designed for individual movement, and the machine requires as many tool driving and selecting devices as there are cutting tools. A cam controlled type automatic screw machine in which the cutting tools are controlled by cams requires complicated combinations of driving levers and link mechanisms. The manufacture of such a machine requires a high degree of technique and a long period of time, and the machine is necessarily very expensive.

There are a number of types of headstock moving automatic screw machines in which the recently advanced art of numerical control has been incorporated, but they still require as many tool driving and selecting devices as there are cutting tools. Thus, they do not constitute any appreciable improvement, as far as the cost of manufacture is concerned.

Consequently, the headstock moving type automatic screw machines are still more costly than automatic screw machines having a stationary headstock.

There is also known a headstock moving type automatic screw machine to which the art of turret lathes has been applied, so that the cutting tools are driven by a turret which is only radially movable back and forth. While this machine has simplified tool driving and selecting devices, the indexing error of the turret has a direct bearing on the working error for the product at the sacrifice of the high accuracy of working possible by the headstock moving type automatic screw machine.

In a headstock moving type automatic screw machine of the type in which cutting tools are disposed radially on a tool stand, it is necessary that chips can be easily removed from an area immediately below the work. Therefore, it is difficult to position the cutting tools immediately below the work, hence to provide an increased number of cutting tools. A machine of the cam driven type involves further complications in the levers and link mechanisms, if the cutting tools are increased. Thus, a conventional headstock moving type automatic screw machine can only be provided with a maximum of five or six cutting tools.

There is also known a headstock moving type automatic screw machine having a spline shaft device, but the high speed of rotation has presented problems of heavy noise and sliding resistance. The axial movement of the headstock disadvantageously complicates the devices disposed in the vicinity of the headstock, for example, devices for operating the chuck, and stopping the headstock temporarily.

In view of the aforementioned problems, it is an object of this invention to provide an automatic screw machine which can work as accurately as a headstock moving type automatic screw machine, without involving any indexing error of the cutting tools relative to the work.

It is another object of this invention to provide an automatic screw machine which is simple and compact in construction, and has an improved working efficiency rendered possible by incorporating a light-weight tool stand.

It is still another object of this invention to provide an automatic screw machine having a stationary headstock, and a light-weight tool stand which is movable along the longitudinal axis of the work.

It is a further object of this invention to provide an automatic screw machine which is easy and inexpensive to manufacture.

Other objects and advantages of this invention will become apparent from the following description taken in conjunction with the accompanying drawings, in which.

Figure 1:
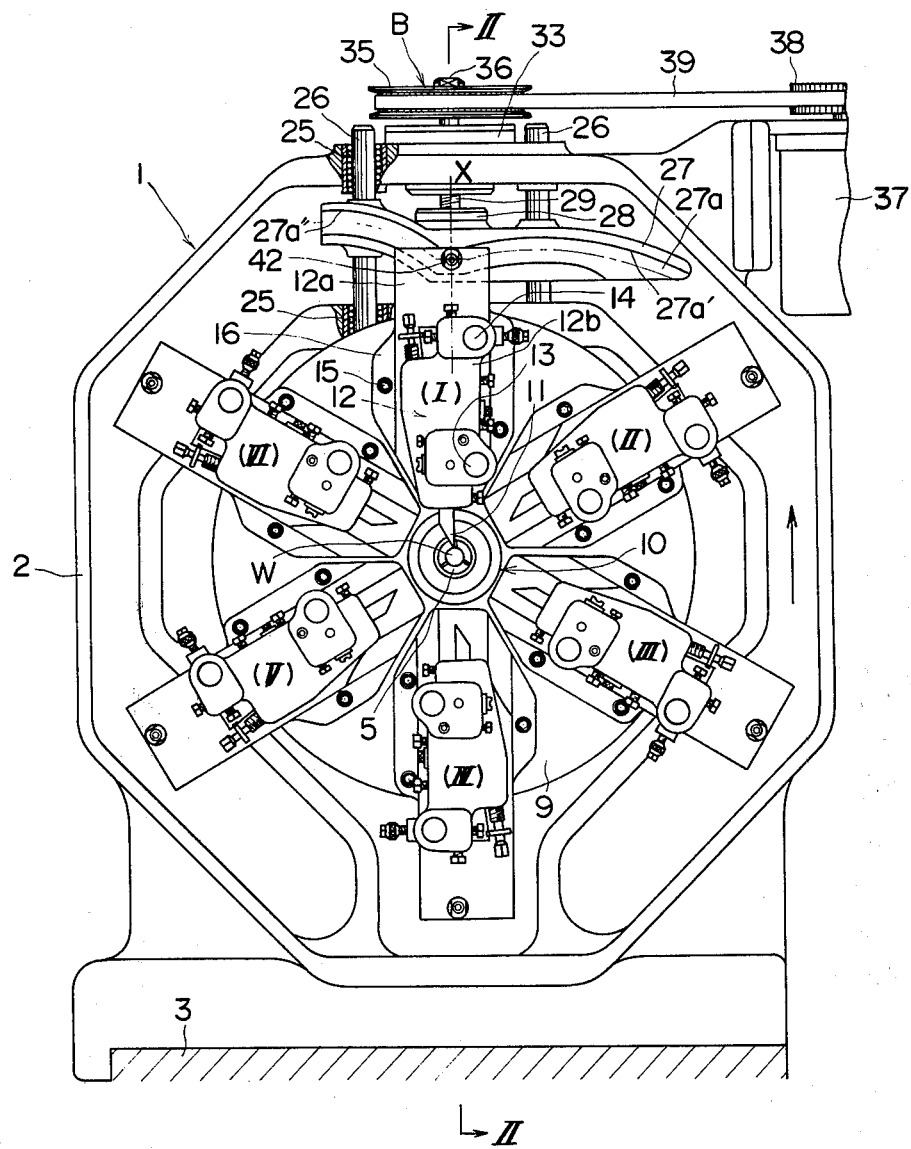
FIG. 1 is a front elevational view of an automatic screw machine embodying this invention.

Referring to the drawings, FIGS. 1 through 4 show a numerically controlled headstock moving type automatic screw machine embodying this invention.

The automatic screw machine includes a tool stand 1 having a frame 2 secured to a machine base 3 by bolts 4. A guide bush 5 is disposed in the center of the tool stand 1 to support work W against vibration. The work W is held by a collet chuck (not shown) in the end of a main spindle 6 for rotation with the main spindle 6, and simultaneously for movement longitudinally of its own axis along a movable base 8 with a headstock 7. The guide bush 5 is mounted in the center of rotation of an indexing member 9 by a mounting unit 10 which is known per se.

A plurality of cutting tools 11 (six in the embodiment shown in the drawings) are radially disposed, and held by tool holders 12.

Each of the tool holders 12 comprises a sliding member 12a, and a tool holding member 12b supported on a pair of pins 13 and 14 secured to the sliding member 12a, and holding a cutting tool 11 in position. Slide bases 16 are secured to the indexing member 9 by bolts 15, etc., and each slide base 16 is provided with a dovetail groove, etc. not shown. The sliding member 12a of each tool holder 12 is slidably engaged with the dovetail groove of one of the slide bases 16, whereby the tool holder 12 is movable to and away from the work W radially relative thereto.

Referring to FIG. 1, there are shown six mutually identical combinations of the cutting tools 11, tool holders 12, sliding members 12a and tool holding members 12b thereof, pins 13 and 14, bolts 15 and slide bases 16, and they are designated by numbers (I) through (VI).

The numerals 11 through 16 are indicated only for combination (I), and omitted for the other combinations (II) through (VI).

The indexing member 9 is supported by a bearing unit 19 in a bearing box 18 secured by a nut 17 to the frame 2, in such a manner that it is rotatable about its own axis, while it is held against any axial movement. A gear 21 is secured to the indexing member 9 by bolts 20, and engaged with an index driving mechanism A (hereinafter described in further detail) for rotating the indexing member 9 about the guide bush 5 to bring a particular tool holder 12 into a tool selecting position X. The bearing unit 19 is secured to the indexing member 9 by a nut 22. A pair of spacers 23 and 24 are provided to maintain the bearings 19 in mutually spaced apart relation, and the spacer 23 is secured by a pin not shown to the bearing box 18 against any axial displacement.

The indexing member 9 is rotated for appropriate selection of the cutting tools 11 as, for example, shown in FIG. 1 which illustrates the instant in which the cutting tool 11 in the combination I located in the uppermost position has been selected for the cutting operation.

The frame 2 is provided with bearings 25 which support shafts 26 vertically slidably along their own axes. A guide member 27 is secured to the shafts 26 and is vertically movable therewith. The guide member 27 is disposed in the tool selecting position X, and connected with a tool driving mechanism B which moves the tool holder 12 in the tool selecting position X to and away from the work W.

A feed nut 28 is provided on the guide member 27, and engaged with a vertically disposed feed screw 29. The feed screw 29 has a lower end supported in bearings 31 in a bearing box 30 secured to the frame 2, while its upper end portion is supported by bearings 34 in a bearing box 33 secured to the frame 2 by bolts 32, so that the feed screw rod 29 is held against axial movement, and rotatable about its own axis.

A pulley 35 is secured by a nut 36 to the upper end of the feed screw rod 29, and connected by a belt 39 to a pulley 38 on the output shaft of a reversible control motor 37 mounted on the frame 2. Nuts 40 and 41 hold the bearing 34 in position against the feed screw rod 29 and the bearing box 33, respectively.

The feed screw rod 29 is rotated in either direction by the control motor 37 which is rotated in either direction in response to a signal from a control unit not shown, and the nut 28 engaged about the feed screw rod 29 moves the guide member 27 to or away from the work W.

The guide member 27 is provided on its front face with a guide surface 27a' which is engaged by a runner 44 on a tool holder 12 upon rotation of the indexing member 9 and moves forward by a predetermined distance the tool holder 12 approaching the tool selecting position X. The guide surface 27a' is defined by the inner wall on the outer periphery of a curved groove 27a formed longitudinally in the front face of the guide member 27, and gradually approaches the work W as it approaches the tool selecting position X.

The sliding member 12a of each tool holder 12 is provided with a shaft 43 secured by a nut 42, and the shaft 43 has a free end on which the runner 44 comprising a roller is rotatably mounted. The runner 44 is received in the groove 27a upon rotation of the indexing member 9 to engage the guide surface 27a', and moves along the guide surface 27a' until it reaches the tool selecting position X where it most closely approaches the work W.

A compression spring 45 is provided between the slide base 16 and the shaft 43 to urge the shaft 43, hence the sliding member 12a and the runner 44, radially outwardly, whereby the 44 is urged against the guide surface 27a'. All the other tool holders 12 in the combinations (II) to (VI) not selected for the tool selecting position X with their runner 44 not engaging the guide surface 27a' are retained by stop members not shown in their respective positions remotest from the work W, so that none of the cutting tools 11 on such tool holders 12 may not be brought into contact with the work W upon rotation of the indexing member 9.

As the runner 44 moves along the guide surface 27a' with rotation of the indexing member 9, the sliding member 12a, hence the tool holder 12 advances a predetermined distance toward the work W by overcoming the action of the compression spring 45. This arrangement constitutes a sort of fast advance system for the cutting tools whereby a particular tool 11 in the non-selected position remote from the work W is brought to as close a position to the work W as possible to thereby improve the working efficiency. This fast advance system according to this invention, in which the rotation of the indexing member is utilized, is very simple and compact in construction, as opposed to various known fast advance systems for the cutting tools, for example, those employing hydraulic cylinders.

Figure 2:
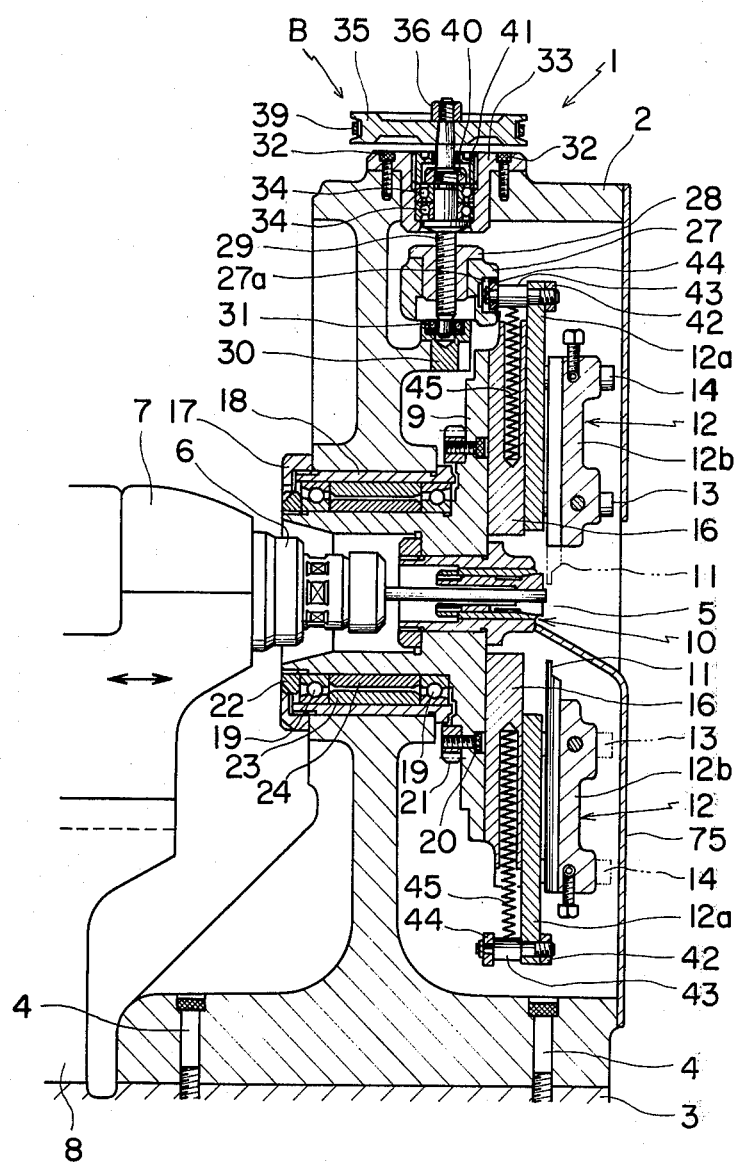
FIG. 2 is a longitudinal sectional view taken along the line II—II of FIG. 1.

As shown in FIG. 2, a cover 75 is inwardly bent over the cutting tools 11 below the work W to prevent any chip, cutting oil, etc. from falling on those cutting tools 11 and the sliding members 12a, and rendering the sliding members 12a incapable of sliding. Such construction of the cover 75 also facilitates removal of chips.

Figure 3:
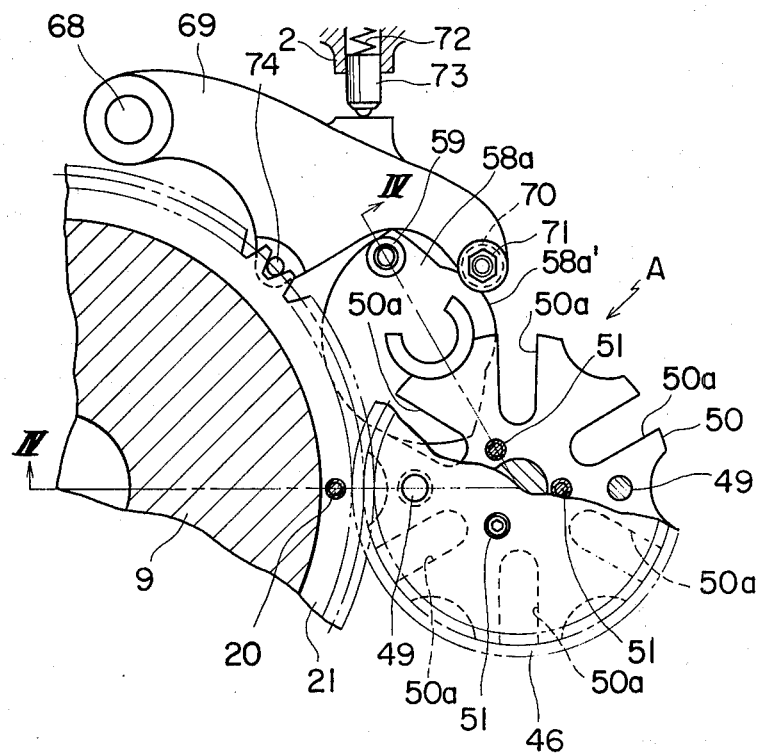
FIG. 3 is a front elevational view partly in section of the indexing mechanism employed in the apparatus shown in FIG. 1.
Figure 4:
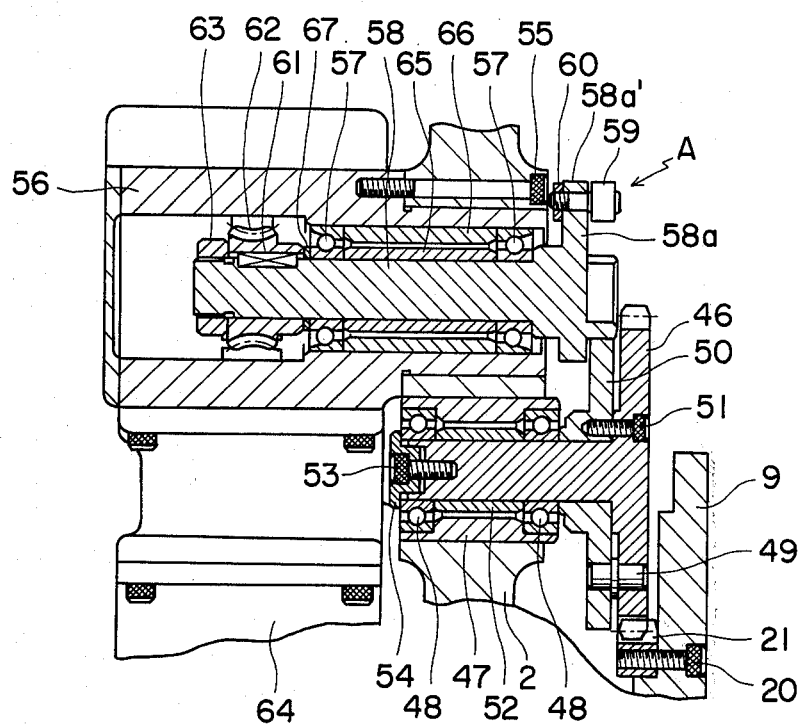
FIG. 4 is a sectional view taken along the line IV-0-IV of FIG. 3.

The index driving mechanism A will now be described in detail with reference to FIGS. 3 and 4. The gear 21 secured to the indexing member 9 by the bolts 20 is engaged with a gear 46 which is rotatably supported by bearings 48 in a bearing box 47 secured to the frame 2 by pins not shown. A Geneva gear 50 positioned by pins 49 is secured to the gear 46 by bolts 51. A spacer 52 is interposed between the bearings 48. A bolt 53 and a clamp 54 hold the bearings 48 against the gear 46.

A box 56 is secured to the frame 2 by bolts 55, and contains bearings 57 by which a driving shaft 58 is rotatably supported. The driving shaft 58 is formed at one end thereof with a flange 58a to which a roller 59 is secured by a nut 60. A worm wheel 62 is secured to the other end of the driving shaft 58 by a nut 63, and held by a key 61 against rotation. The worm wheel 62 is engaged with a worm disposed behind the worm wheel 62 and not shown in FIG. 4, by which power is transmitted from a motor 64 to the worm wheel 62. Spacers 65 and 66 are provided between the bearings 57, and a spacer 67 between the bearing 57 and the worm wheel 62. The spacers 65, 66 and 67 are secured to the box 56 by pins not shown, to hold the bearings 57 and the worm wheel 62 against axial movement. A shaft 68 is supported on the frame 2, and an arm 69 is rotatably supported on the shaft 68. The arm 69 has a free end on which a roller 70 is secured by a nut 71.

The flange 58a of the driving shaft 58 has an outer periphery defining a cam surface 58a' with which the rotating member 70 is engaged. A compression spring 72 and an abutment member 73 are provided in the frame 2 to urge the arm 69 for rotation clockwise as viewed in FIG. 3, whereby the rotating member 70 is always held against the outer peripheral cam surface 58a' on the flange 58a. A pin 74 is secured to the arm 69, and adapted for fitting between a pair of adjoining teeth on the gear 21 upon arrival of the rotating member 70 at the minimum radius portion of the cam surface 58a' to thereby locate the gear 21 and the indexing member 9 in the correct indexing position.

Description will now be made of the operation of the apparatus hereinabove described. The runner 44 for a particular cutting tool 11 selected for the tool selecting position X {tool 11 in the position (I) in FIG. 1} engages the guide surface 27a' on the guide member 27, and normal rotation of the feed screw 29 driven by the control motor 37 causes the guide member 27 and the tool holder 12, hence the cutting tool 11 to advance toward the work W, so that the cutting tool 11 performs the cutting operation as desired. Upon completion of the desired cutting operation, the control motor 37 is actuated to rotate the feed screw 29 in the reverse direction to start retraction of the cutting tool 11, with the guide member 27 and the tool holder 12, from the work W, and simultaneously, the indexing member 9 starts the indexing operation. The driving force for the indexing member 9 is transmitted from the motor 64 to the worm wheel 62 and the driving shaft 58. The roller 59 engages in a slot 50a on the Geneva gear 50 to cause intermittent rotation of the Geneva gear 50, hence the rotation of the gears 46 and 21, whereby the indexing member 9 is rotated counterclockwise as viewed in FIG. 1.

The runner 44 for the cutting tool 11 to be moved away from the tool selecting position X moves along an exit guide surface 27a" on the guide member 27 counterclockwise in FIG. 1 to retract cutting tool 11 toward its rearmost position. At the same time, the runner 44 for the cutting tool 11 to be selected for the next cutting operation {cutting tool shown at (II) in Fig. 1} engages in the guide groove 27a, moves along the guide surface 27a' counterclockwise in FIG. 1 to thereby advance the cutting tool 11 toward the work W. The roller 70 provided at the end of the arm 69 moves from the maximum radius portion to the minimum radius portion of the cam surface 58a' on the flange 58a of the driving shaft 58. Upon arrival of the roller 70 at the minimum radius portion, the pin 74 fits between a pair of adjoining teeth on the gear 21 to stop the rotation of the indexing member 9 and hold it in position, whereupon the selection of the cutting tool is completed.

Upon completion of the tool selection, the control motor 37 is actuated again to move the cutting tool 11, with the guide member 27 and the tool holder 12, to and away from the work W. The motor 64 is controlled by a control device not shown to be intermittently driven only when the indexing operation is required.

According to this invention, in which the indexing member 9 is rotated about the guide bush 5 integrally therewith, no error can arise in the indexing of the cutting tools 11 for the work W, but it is possible to obtain a high degree of working accuracy which is comparable to what may be obtained by a headstock moving type automatic screw machine.

As opposed to the known machines which require as many tool driving and selecting devices as there are cutting tools, it is often sufficient in accordance with this invention to have only one set of tool driving and selecting devices. The apparatus thereby can be simplified in construction and reduced in size, and the tool stand can be reduced in weight. These features contribute to facilitating the manufacture of the machine and shortening the time required for its manufacture, thereby sharply reducing the cost of the machine.

The number of the cutting tools which can be provided in the known headstock moving type automatic screw machines has been restricted by the necessity of providing a sufficient space for accommodating tool driving and selecting devices, and the unavailability of the space below the work for disposing any cutting tool. According to this invention, however, it is not necessary to take any such restriction into consideration, but it is possible to provide an increased number of cutting tools easily. As is obvious from the foregoing description and the accompanying drawings, it is only necessary to leave a space for accommodating the sliding members 12a, the slide base 16, etc., and after such a space is secured, it is easy to employ as many as, say, 8 to 12 cutting tools in the machine of this invention.

While the embodiment as hereinabove described in an example in which this invention is applied to a numerically controlled headstock moving type automatic screw machine, it is equally possible to apply this invention to a conventional cam controlled type automatic screw machine. It will also be understood that the guide surface 27a' on the guide member 27, the index driving mechanism A, the tool driving mechanism B, etc. are in no way limited to those shown in the drawings, but that it is easy to provide two or more guide members 27 for the cutting tools to be selected, and driving mechanisms B for the cutting tools selected.

Figure 5:
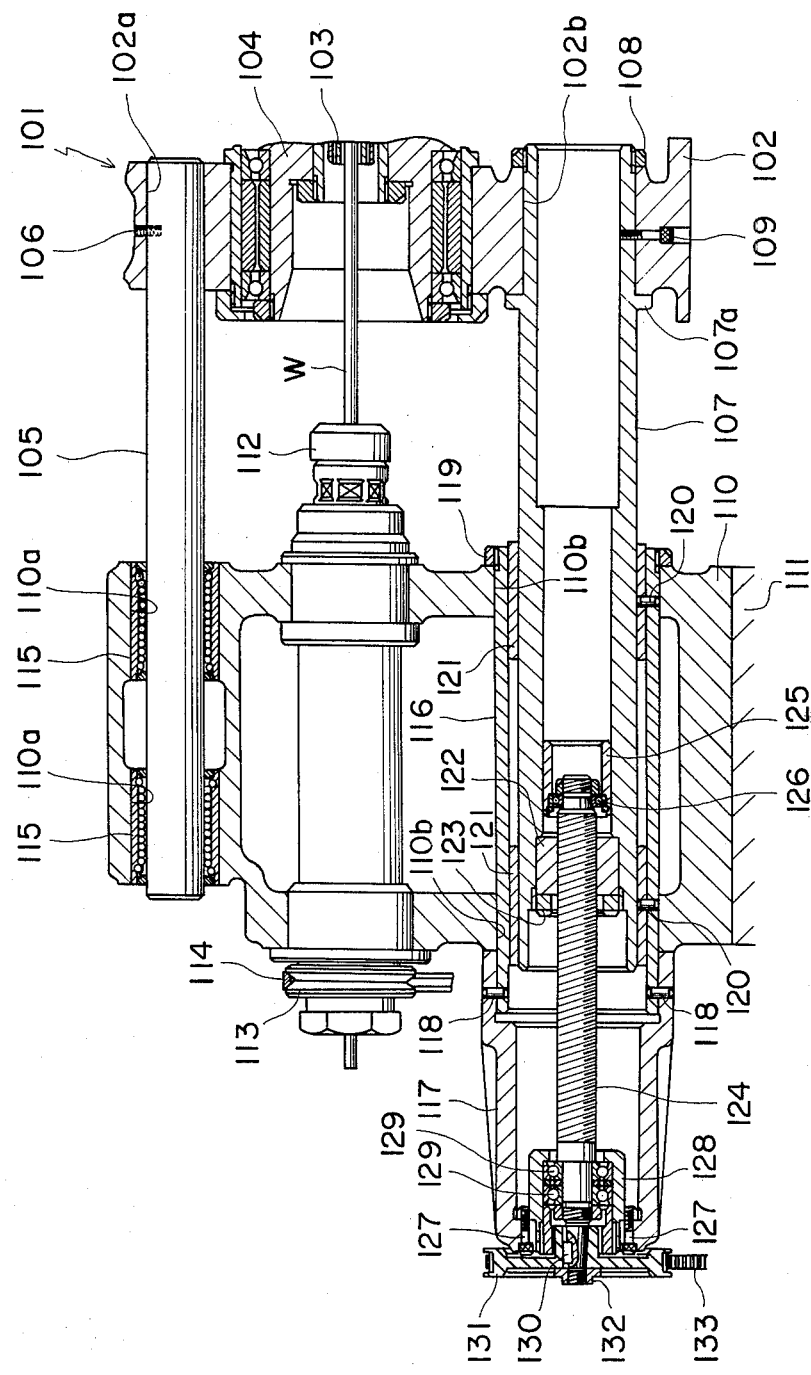
FIG. 5 is a longitudinal sectional view showing another embodiment of this invention.

Attention is now directed to FIG. 5 showing another embodiment of this invention. This embodiment is an example in which this invention has been applied to an automatic screw machine having a stationary headstock 110 and a tool stand 101 which is movable along the longitudinal axis of the work W. It has been realized only by virtue of the reduction in weight of the tool stand according to this invention, as has also been described in connection with the embodiment shown in FIGS. 1 through 4.

FIG. 5 shows the headstock and a part of the tool stand in a numerically controlled automatic screw machine. A frame 102 for the tool stand 101 does not have any bottom portion of the sort by which the frame for the machine shown in FIGS. 1 through 4 is connected to the machine base 3. The machine shown in FIG. 5 includes an indexing member 104 provided in the center of its rotation with a guide bush 103 for supporting the work W, and supported on the frame 102 rotatably about the guide bush 103.

The frame 102 for the tool stand 101 is provided with a pair of holes 102a and 102b spaced respectively above and below the guide bush 103. A shaft 105 extends through the upper hole 102a, and is secured to the frame 102 by a bolt 106. A hollow shaft 107 extends through the lower hole 102b, and has a flange 107a abutting on the frame 102 at one end of the hole 102b. A nut 108 is placed about the extremity of the hollow shaft 107 to hold the shaft 107 against the frame 102 in conjunction with the flange 107a. A bolt 109 further secures the shaft 107 to the frame 102.

The remaining part of the tool stand 101 is of the same construction as what has already been described with reference to FIGS. 1 through 4, and is not shown or described any longer.

The headstock 110 is secured to a machine base 111, and supports a main spindle 112 rotatably. The rotation of a driving motor not shown in transmitted to the main spindle 112 by a belt 114 passed around a pulley 113 to thereby rotate it. The headstock 110 is provided at its top with a pair of coaxial holes 110a in which bearings 115 are coaxially disposed to support the shaft 105 slidably therein. The headstock 110 is also provided at its bottom with a pair of coaxial holes 110b in which a holding sleeve 116 is received at its opposite ends. A supporting box 117 is inserted over the outer periphery of the holding sleeve 116 at one end thereof, and secured thereto by pins 118. A nut 119 placed about the other end of the holding sleeve 116 secures the holding sleeve 116 and the supporting box 117 to the headstock 110. A pair of bearings 121 are coaxially disposed in the holding sleeve 116, and secured thereto by pins 120. The hollow shaft 107 axially slidably extends through the bearings 121. A feed nut 122 is clamped by a nut 123 in the end of the hollow shaft 107 remote from the frame 102, and held against rotation by a key not shown.

A feed screw 124 is engaged with the feed nut 122, and has one end rotatably supported by bearings 126 in a sliding tube 125 axially slidably received in the hollow shaft 107. A bearing box 128 is secured in the supporting box 117 by bolts 127, and accommodates bearings 129 which hold the feed screw 124 against axial movement, but support it rotatably about its own axis. The feed screw 124 has an extremity which projects beyond the bearing box 128, and to which a pulley 131 held by a key 130 against rotation is secured by a nut 132. A belt 133 passed around the pulley 131 transmits the rotation of a reversible control motor not shown to the feed screw 124.

In operation, when the feed screw 124 is rotated in either direction as it is driven by the control motor not shown, the frame 102 for the tool stand 101, along with the feed nut 122, the hollow shaft 107 and the shaft 105, is moved along the length of the work W held by a collet chuck (not shown) in the end of the main spindle 112 for rotation therewith.

The shaft 105, which has been shown and described as a solid shaft, may alternatively be made of the hollow construction, and provided in the end thereof remote from the frame 102 with a feed nut engaged about a feed screw which is substituted for the feed nut 122 in the hollow shaft 107 as shown and described.

According to this invention, it has become possible to reduce the weight of the tool stand on an automatic screw machine, as is obvious from the embodiment shown in FIGS. 1 through 4, and move the tool stand along the length of the work as has been described with reference to FIG. 5. By virtue of these features, the chuck operating device, temporary stop device, etc. in the vicinity of the main spindle can be simplified in construction, and the spline shaft for rotating the main spindle, etc. can be eliminated, so that the machine can be manufactured easily and inexpensively. Moreover, the machine according to this invention provides a high degree of working accuracy, as it has the function of a headstock moving type automatic screw machine to cut the work supported on a guide bush.

According to this invention, there is, thus, provided an automatic screw machine comprising an indexing member provided in the center of rotation with a guide bush supporting work, and supported on a frame for a tool stand rotatably about the guide bush, a plurality of tool holders disposed on the indexing member, and supporting cutting tools radially movably to and away from the work, an index driving mechanism for rotating the indexing member about the guide bush to bring one of the tool holders into a tool selecting position, and a tool driving mechanism provided in the tool selecting position for moving the tool holder in the tool selecting position to and away from the work. As the indexing member is rotated for indexing purposes about the guide bush integrally therewith, no error arises at all in the indexing of the cutting tools relative to the work, but a high degree of working accuracy which is comparable to what can be obtained by a headstock moving type automatic screw machine can be accomplished. While a conventional screw machine requires as many tool driving and selecting devices as there are cutting tools, the machine of this invention requires only a minimum of one set of such devices, whereby the tool stand can be reduced in weight, thereby reducing the cost of the machine.

According to this invention, it is further possible to provide an increased number of cutting tools easily without the necessity of considering any restriction due to the space or other requirements.

According to another aspect of this invention, a guide member is associated with the tool driving mechanism, and formed with a guide surface which is engaged by a runner on a tool holder upon rotation of the indexing member to advance the tool holder approaching the tool selecting position toward the work by a predetermined distance. Thus, the driving force for the indexing operation is utilized effectively for the fast feed of any cutting tool with a simple and compact system, so that the working efficiency of the machine is improved.

According to a further aspect of this invention, in which the devices can be simplified in construction and reduced in size, and the tool stand reduced in weight, the tool stand can be moved along the longitudinal axis of the work, while the headstock is stationary, whereby the structure in the vicinity of the main spindle can be simplified without requiring any spline shaft for rotating the main spindle, so that the machine can be manufactured easily and inexpensively.

What is claimed is:

1. An automatic screw machine comprising:
   an indexing member provided in the center of rotation with a guide bush supporting work thereon, and supported on a frame for a tool stand rotatably about said guide bush;
   a plurality of tool holders disposed on said indexing member, and supporting cutting tools radially movably to and away from said work;
   an index driving mechanism for rotating said indexing member about said guide bush to bring one of said tool holders into a tool selecting position; and
   a tool driving mechanism provided in said tool selecting position for moving said one tool holder in said tool selecting position to and away from said work.

2. An automatic screw machine as set forth in claim 1, wherein said tool driving mechanism includes a guide member, and a runner on each of said tool holders, said guide member having a guide surface which is engaged by said runner on one of said tool holders upon rotation of said indexing member to move said one tool holder approaching said tool selecting position forward by a predetermined distance toward said work.

3. An automatic screw machine as set forth in claim 1 or 2, including a headstock secured to a machine base, two shafts secured to said frame for said tool stand, and supported slidably on said headstock, at least one of said two shafts being hollow, a feed nut secured in said at least one hollow shaft at the end thereof which is remote from said frame, and a feed screw rotatably supported on said headstock, and engaged with said feed nut to move said frame along the longitudinal axis of said work.

* * * * *